Figure 1:
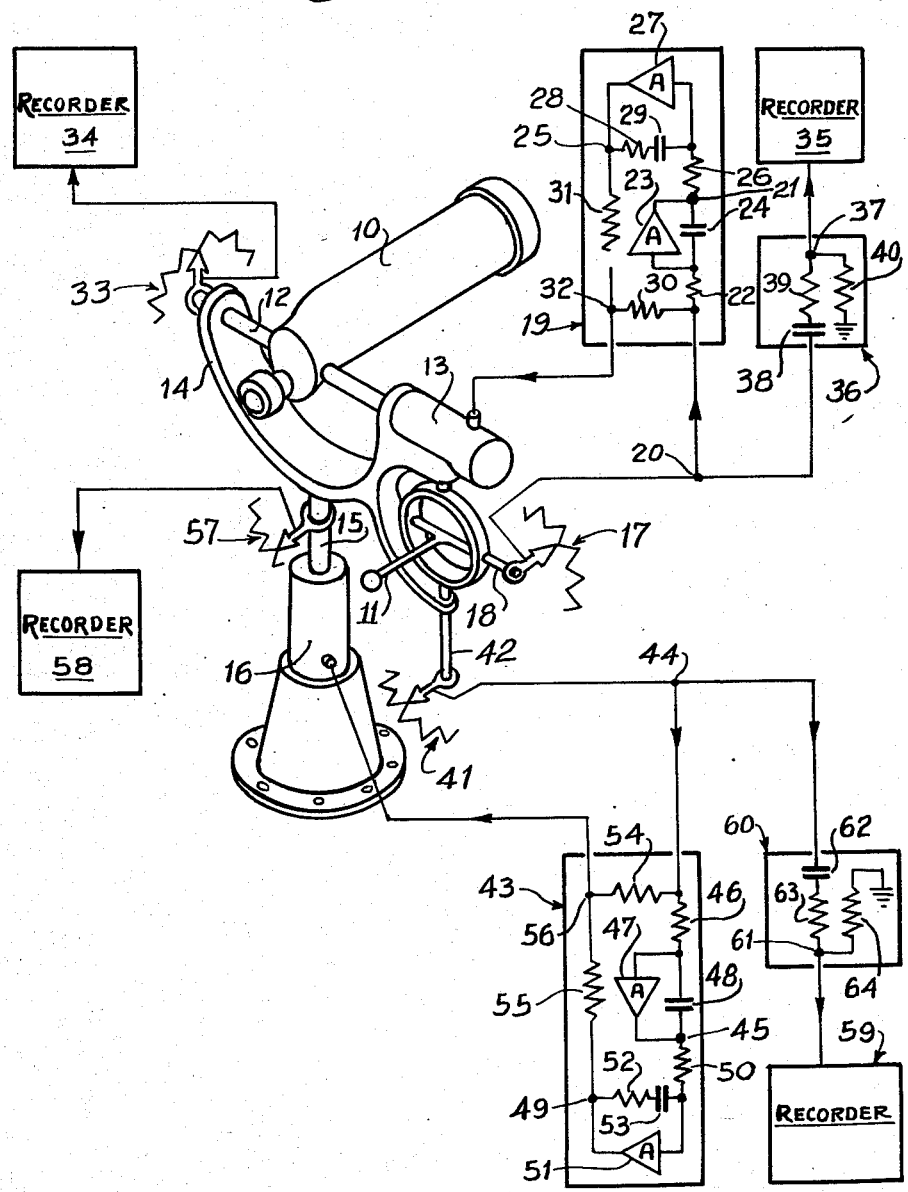

June 3, 1958 H. A. WAGNER 2,836,894
OPTICAL TRACKING RECORDING SYSTEM
Filed April 19, 1954 4 Sheets-Sheet 1

INVENTOR.
Herbert A. Wagner
BY

INVENTOR.
Herbert A. Wagner.

June 3, 1958  H. A. WAGNER  2,836,894
OPTICAL TRACKING RECORDING SYSTEM
Filed April 19, 1954  4 Sheets-Sheet 3

INVENTOR.
Herbert A. Wagner.
BY

United States Patent Office 2,836,894
Patented June 3, 1958

2,836,894

OPTICAL TRACKING RECORDING SYSTEM

Herbert A. Wagner, Thousand Oaks, Calif., assignor to H. A. Wagner Company, Van Nuys, Calif.

Application April 19, 1954, Serial No. 424,191

9 Claims. (Cl. 33—46)

The measurement of the azimuth and elevation angles of the direction of the line of sight to an object in motion with respect to a given angular coordinate system by means of an optical instrument, such as a theodolite, requires the use of a human operator for training the optical axis of the instrument toward the object. Because the tracking task is not performed perfectly, that is, the optical axis is not directed exactly toward the object, the tracking errors must be measured and used as corrections to the measured azimuth and elevation angles of the telescope. In known instruments, the tracking errors are photographed as the image of the object in the telescope relative to a crosshair, and later measured by human action, which process is time-consuming and costly. This method is embodied in the Askania Phototheodolite.

The present invention provides recorded information for an automatic determination of the tracking errors in azimuth and elevation thereby permitting the use of an automatic computer for performing the required corrections.

The tracking error is the only incentive for the operator to make a tracking motion. The present invention makes use of this fact to derive an estimate of the tracking error from the tracking motion. This estimate is then used as a correction to the measured angular direction of the telescope. The determination of the estimate of the tracking error requires a certain time. Accordingly, the estimated tracking error is applied as correction to that angular direction of the telescope which is measured a fixed increment of time earlier.

In order to make the psychological relationship between the observed tracking error and the consequent tracking motion of the observer sufficiently dependable for permitting the derivation of a reasonably accurate estimate of the tracking error from the tracking motion, the invention provides two means. First, the operator has to move a control stick of only small mass so that the physical effort is not materially larger than that of moving his hand. The large angular motions of the telescope as needed for tracking are attained by a servo mechanism which is activated by the motion of the control stick. Second, this servo mechanism provides in a known manner for aided tracking (see Theory of Servo Mechanisms by James, Nichols and Phillips, McGraw-Hill Book Company, Inc., 1947), that is, the directional position of the telescope is made equal to the sum of a value proportional to the position of the control stick and a value proportional to the time-integral of the position of the control stick to wit, the tracking direction is controlled by a first order aided tracking means; preferably, a value proportional to the second time integral is added too in which case the aided tracking means is a second order aided tracking means. As is well known in this art an aided tracking means is a device which transfers the motion of a manual control element such as a hand wheel to the reticle and includes a position control device, and a speed control device (see Theory of Servo Mechanisms supra p. 361). The position of the motion of the reticle is thus dependent on the combined action of the position control device and the speed control device. Where the motion is only responsive to the position control device and the speed control device the aided tracking mechanism is known as a first order tracking mechanism. However, we may also introduce a third control device which by analogy may be termed an acceleration control device which in addition to adding a control responsive to the speed also introduces a control responsive to acceleration of the control element. Thus the motion of the reticle is responsive not only to control element position but to the speed with which it is moved and also to the acceleration of the control handle when the device is not moved at a constant speed. Such an aided tracking device is termed a second order tracking mechanism. This aided tracking reduces to a minimum the length of each period of time during which the operator has to move his control stick in a certain direction. Long periods of such a nature would induce the operator to guess a continuation of this motion. Such a guess, being based on intelligence rather than instinct, makes the tracking result unpredictable for different operators. Provided that the operator has to move only a small mass and that an effective method of aided tracking is used, all operators behave quite uniformly and move the manual control device in proportion to the tracking error, moving the device faster, the larger the tracking errors. In other words, the tracking error is related to the speed of the control stick motion and the control stick position for error-free tracking at an earlier time. The invention provides for the above described means for the achievement of uniform operator performance and for the recording of the control stick motion as a basis for an estimate of the tracking error or, which is equivalent, for an estimate of the control stick position which would have avoided a tracking error. In prior art aided-tracking systems, the only physical quantity which exists outside of the human system, which is sufficiently closely related to the observed tracking error which is recorded in my invention, is in the prior art lost because it is unrecorded. It is an important feature of my invention that it recognizes the fact that such record makes possible the correction of the observations and the reduction of the error of the observer.

To illustrate a first specific embodiment of the invention, a schematic illustration of a tracking-recording system is shown in Figure 1. A telescope 10 which is equipped with a reticle is provided so that an operator can observe the tracking error, namely the position of the moving object relative to the reticle. The control stick 11 is supported by a gimbal so that it can be moved by the operator in azimuth and in elevation according to the observed tracking error. The telescope 10 is movable about the horizontal elevation axis 12 by the motor 13 relative to frame 14. The frame 14 is movable about the vertical azimuth axis 15 by the motor 16, the case of which has its reference fixed to the earth. A potentiometer 17 is mounted so that its contact is coupled to horizontal axis 18—i. e., the elevation axis—and the case of potentiometer 17 is attached to the inner gimbal supporting the control stick 11 so that the output of potentiometer 17 is proportional to the control stick position in elevation relative to the inner gimbal. This signal is used to drive the motor 13 through a control mechanism 19 so that the shaft 12 of the motor 13 rotates an amount proportional to the sum of the control stick position in elevation, the first time integral of control stick position in elevation, and the second time integral of the control stick position in elevation. This is accomplished by a conventional control mechanism having a high frequency response as compared to the human operator.

The art of servo mechanisms is developed sufficiently to permit the above described control by several means, e. g., mechanical integrators such as ball-disk integrators and differential gears, magnetic and electronic amplifiers and other devices well known in the art. See High-Speed Computing Devices by the staff of Engineering Research Associates, Inc., McGraw-Hill Book Company, Inc., 1950. As an example, an electronic circuit which forms the required sum of the control stick position, its first time integral and its second time integral is shown as mechanism 19. The voltage at terminal 20 is proportional to the control stick position in elevation. This voltage is transformed into a voltage at terminal 21 which is made proportional to the time integral of the voltage at terminal 20 by the circuit consisting of resistor 22 connected in series with the parallel-connected operational amplifier 23 and condenser 24. The voltage at terminal 21 is transformed into a voltage at terminal 25 which is made proportional to the sum of the voltage at terminal 21 plus the time integral of the voltage at terminal 21—this voltage at terminal 25 being the sum of the first time integral and the second time integral of the voltage at terminal 20—by the circuit consisting of resistor 26 in series with the parallel-connected operational amplifier 27 and resistor 28 and condenser 29. The voltages at terminals 20 and 25 are summed through resistors 30 and 31, this sum appearing at terminal 32 is the voltage output of the computer 19 and consists of the sum of voltages corresponding to the control stick position, the first time integral of the control stick position and the second time integral of the control stick position. This voltage is then used to position shaft 12 by usual servo mechanism techniques. See, for instance, Principles of Servo Mechanisms by Brown and Campbell, John Wiley and Sons, Inc., 1948 and Theory of Servo Mechanisms by James, Nichols and Phillips, McGraw-Hill Book Company, 1947.

The potentiometer 33 is mounted with its contact coupled to the elevation axis 12 of the telescope 10 and its case attached to frame 14 so that it generates an electrical signal proportional to the elevation angle of the telescope. This signal is fed to, and recorded by, the conventional recorder 34. The signal output of potentiometer 17 is also fed to a conventional recorder 35 for a later evaluation of the tracking error. Preferably, however, the signal output of the potentiometer 17 is first fed through a circuit 36 which forms the smoothed rate of change of the control stick position in elevation. Circuit 36 forms a voltage at terminal 37 from the voltage at terminal 20 equal to the smoothed rate of change of the voltage at terminal 20 by means of condenser 38 and resistor 39 in series between terminals 37 and 20 and resistor 40 connected between ground and terminal 37. The voltage at terminal 37 is proportional to the estimate of the elevation tracking error which is recorded in the recorder 35 which as seen is connected to the position control element of the position control device.

The position in azimuth of the control stick 11 is converted into an electrical signal by a potentiometer 41 which is mounted so that its contact is coupled to the vertical shaft 42 of the control stick 11 and its case is attached to frame 14 so that it generates an electric signal proportional to the control stick position relative to frame 14. This electrical signal is used to drive motor 16 through a control mechanism 43 of a usual type so that the shaft of motor 16 rotates an amount proportional to the sum of the control stick position in azimuth, the first time integral of the control stick position in azimuth, and the second time integral of the control stick position in azimuth, this being accomplished by a conventional servo mechanism having a high frequency response as compared to the human operator. As an example, an electronic circuit which forms the required sum of the control stick position, its first time integral and its second time integral is shown as mechanism 43. The voltage at terminal 44 is proportional to the control stick position in azimuth. This voltage is transformed into a voltage at terminal 45 which is made proportional to the time integral of the voltage at terminal 44 by the circuit consisting of resistor 46 connected in series with the parallel-connected operational amplifier 47 and condenser 48. The voltage at terminal 45 is transformed into a voltage at terminal 49 which is made proportional to the sum of the voltage at terminal 45 plus the time integral of the voltage at terminal 45—this voltage at terminal 49 being the sum of the first time integral and the second time integral of the voltage at terminal 44—by the circuit consisting of resistor 50 in series with the parallel-connected operational amplifier 51 and resistor 52 and condenser 53. The voltages at terminals 44 and 49 are summed through resistors 54 and 55; this sum appearing at terminal 56 is the voltage output of the computer 43 and consists of the sum of voltages corresponding to the control stick position, the first time integral of the control stick position and the second time integral of the control stick position.

The potentiometer 57 is mounted with its contact coupled to the shaft 15 and its case is attached to motor 16 so that it provides an electrical signal proportional to the azimuth angle of the telescope 10, which signal is recorded in conventional recorder 58. Furthermore, the signal output of potentiometer 41 is either directly fed to the conventional recorder 59 for a later determination of the tracking error, or, preferably, this signal output is first fed through the circuit 60 which forms the smoothed rate of change of the control stick position in azimuth. Circuit 60 forms a voltage at terminal 61 from the voltage at terminal 44 equal to the smoothed rate of change of the voltage at terminal 44 by means of condenser 62 and resistor 63 in series between terminals 61 and 44 and resistor 64 connected between ground and terminal 61. The voltage at terminal 61 is proportional to the estimate of the azimuth tracking error which is recorded in recorder 59.

The estimation of the tracking error as computed by the circuits 36 and 60 must not necessarily be restricted to a smoothed rate of change of the motion of the control stick. As an example, the effect of the angular inaccuracy of seeing of the human eye can be corrected by the addition to the record of a fixed angular value in the direction of the smoothed rate of change of the direction of the control stick. In some applications of this invention, for instance when the motion of the moving object is of such a nature that the angular accelerations required from the telescope are very small, the control mechanisms 19 and 43 which control the motions of the motors 13 and 16, respectively, need not form the second time integral of the position of the control stick. Instead, these control mechanisms 19 and 43 can be designed to move the telescope according to the sum of the control stick position and the first time integral of the control stick position.

Figure 2:
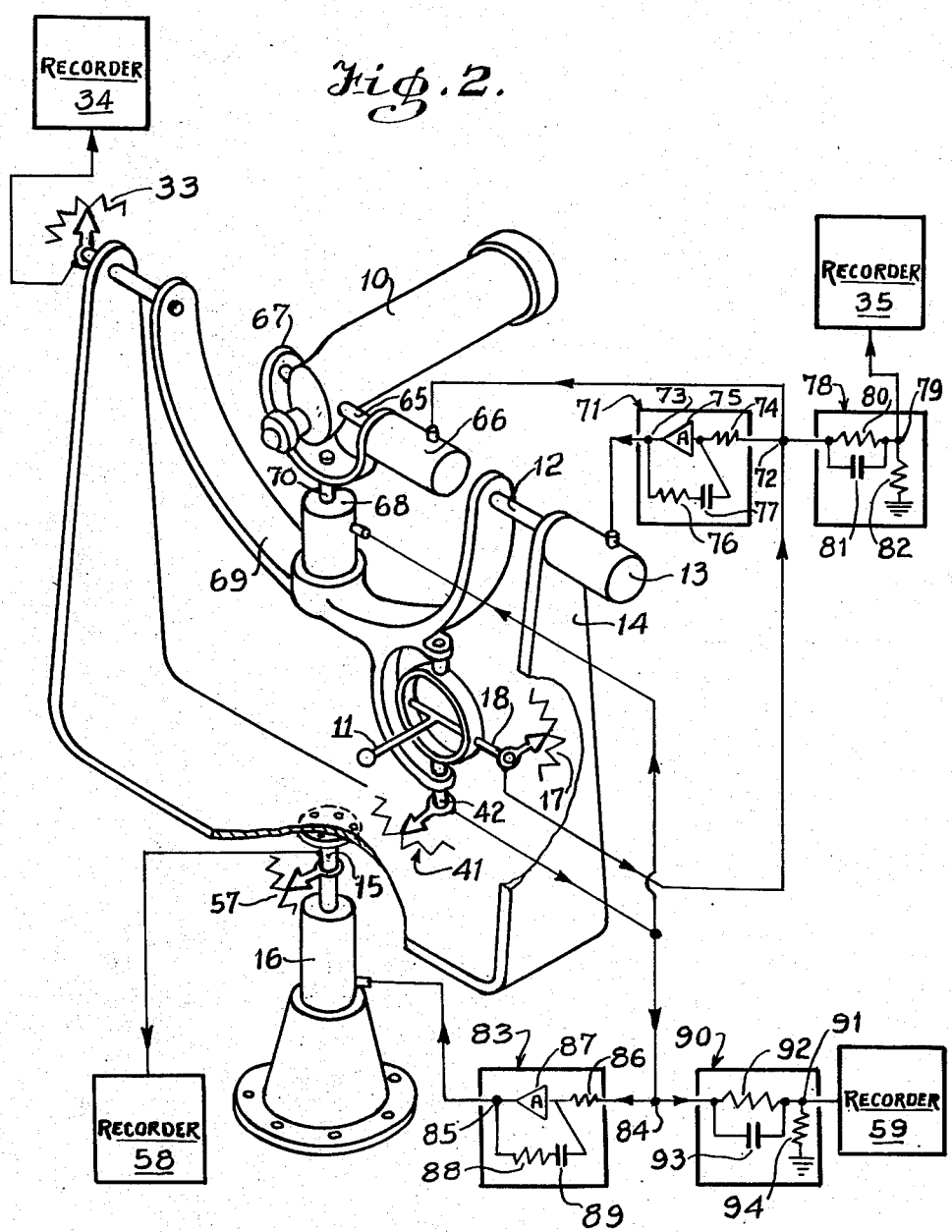

To illustrate a second specific embodiment of the invention, a schematic illustration of a tracking-recording system is shown in Figure 2. A telescope 10, equipped with a reticle, is provided so that an operator can observe the tracking error, namely the position of the moving object relative to the reticle. The control stick 11 is supported by a gimbal so that it can be moved by the operator in azimuth and elevation according to the observed tracking error. The telescope 10 is movable about the horizontal elevation axis 65 by the motor 66 relative to frame 67. The frame 67 is movable by the motor 68 relative to frame 69 about the vertical shaft 70. The frame 69 is also movable about the horizontal shaft 12 by the motor 13 relative to frame 14. The frame 14 is movable in azimuth about the vertical shaft 15 by means of the motor 16. The case of motor 16 has its reference fixed to the earth. The potentiometer 17 is mounted with its contact coupled to the horizontal shaft 18—i. e., the elevation axis—of the control stick 11 and its case attached to the inner gimbal supporting the control stick. This potentiometer 17 is used to convert the control stick position in elevation relative to the inner gimbal into an electrical signal. This signal output is used to drive the motor 66 so that the shaft of motor 66 rotates relative to the frame 67 by an angle proportional to the control stick position in elevation. This rotation is accomplished by a conventional position servo mechanism having a high frequency response compared to the human operator. See, for instance, Theory of Servo Mechanisms, by James, Nichols and Phillips, McGraw-Hill Book Company, Inc., 1947. Should the control stick 11 be mounted on the frame 69—as shown in Figure 2—this rotation could also be provided by a mechanical linkage between the control stick and the telescope.

The electrical signal output from the potentiometer 17 is sent to the control mechanism 71 which moves the motor 13 with a speed proportional to the elevation position of the control stick or, preferably, proportional to the sum of the elevation position of the control stick and the time integral of this position.

As an example, an electronic circuit which forms the required sum of the control stick position and its first time integral is shown as mechanism 71. The voltage at terminal 72 is proportional to the control stick position in elevation. This voltage is transformed into a voltage at terminal 73 which is made proportional to the sum of the voltage at terminal 72 plus the time integral of the voltage at terminal 72 by the circuit consisting of resistor 74 in series with the parallel-connected operational amplifier 75 and resistor 76 and condenser 77. The voltage at terminal 73 is proportional to the sum of the control stick position and the time integral of the control stick position, and is used to control the speed of motor 13 by conventional servo mechanism techniques. See Theory of Servo Mechanisms by James, Nichols and Phillips, McGraw-Hill Book Company, 1947, and Principles of Servo Mechanisms by Brown and Campbell, John Wiley and Sons, Inc., 1948.

A potentiometer 33 is mounted with its output shaft coupled to the shaft 12 and its case attached to the frame 14. This potentiometer 33 provides an electrical signal proportional to the deflection angle of frame 69 in elevation. This signal is recorded in the conventional recorder 34. The signal output of potentiometer 17 is also fed through circuit 78 which forms the smoothed sum of the control stick position in elevation and the rate of change of the control stick position in elevation. Circuit 78 forms a voltage at terminal 79 which is equal to the smoothed sum of the voltage at terminal 72 and the rate of change of the voltage at terminal 72 by means of a resistor 80 and condenser 81 connected in parallel between terminals 72 and 79 and terminal 79 is connected to ground through resistor 82. The voltage at terminal 79 is proportional to the estimate of the elevation tracking error plus the control stick position in elevation. This voltage is recorded in conventional recorder 35.

The position of the control stick 11 in azimuth relative to frame 69 is converted into an electrical form by potentiometer 41 which is mounted with its contact coupled to the vertical shaft 42 and its case attached to frame 69. This electrical signal output is used to drive the motor 68 so that the shaft 70 of motor 68 rotates relative to the frame 69 by an angle proportional to the control stick position in azimuth. This rotation is accomplished by a conventional position servo mechanism having a high frequency response as compared to the human operator. This rotation could also be provided by a mechanical linkage between the control stick and the telescope. The electrical signal output from the potentiometer 41 is sent to the control mechanism 83 and is used to move the motor 16 with a speed which is proportional to the azimuth position of the control stick or, preferably, proportional to the sum of the azimuth position of the control stick and the time integral of this position. As an example, an electric circuit which forms the required sum of the control stick position and its first time integral is shown as mechanism 83. The voltage at terminal 84 is proportional to the control stick position in azimuth. This voltage is transformed into a voltage at terminal 85 which is made proportional to the sum of the voltage at terminal 84 plus the time integral of the voltage at terminal 84 by the circuit consisting of resistor 86 in series with the parallel-connected operational amplifier 87 and resistor 88 and condenser 89. The voltage at terminal 85 is proportional to the sum of the control stick position and the time integral of the control stick position, and is used to control the speed of motor 16 by conventional servo mechanism techniques. A potentiometer 57 is mounted with its contact coupled to the shaft 15 which supports the frame 14 and its case attached to the case of motor 16. This potentiometer provides an electrical signal proportional to the azimuth angle of the frame 14. This signal is recorded in conventional recorder 58. The signal output of potentiometer 41 is also fed through circuit 90 which forms the smoothed sum of the control stick position in azimuth and the rate of change of the control stick position in azimuth. Circuit 90 forms a voltage at terminal 91 which increases exponentially with time to a voltage equal to the smoothed sum of the voltage at terminal 84 and the rate of change of the voltage at terminal 84 by means of resistor 92 and condenser 93 connected in parallel between terminals 84 and 91 and terminal 91 is connected to ground through resistor 94. The voltage at terminal 91 is proportional to the estimate of the azimuth tracking error plus the control stick position in azimuth. This voltage is recorded in the recorder 59.

In a variation of the second specific embodiment of the invention, a telescope containing the reticle is directly mounted on frame 69 and only the reticle is moved—in both axes—within the telescope according to the position of the handle, either directly, i. e., by a mechanical link, or by means of a servo mechanism. As another variation, instead of making the reticle movable, a mirror which can be tilted around two axes is introduced into the optical path between the fixed reticle and the object to be tracked, either as a part of the prism system within the telescope or in front of the objective lens, the tilt angle of such a mirror being made proportional in both axes to the angular position of the control stick.

Figure 3:
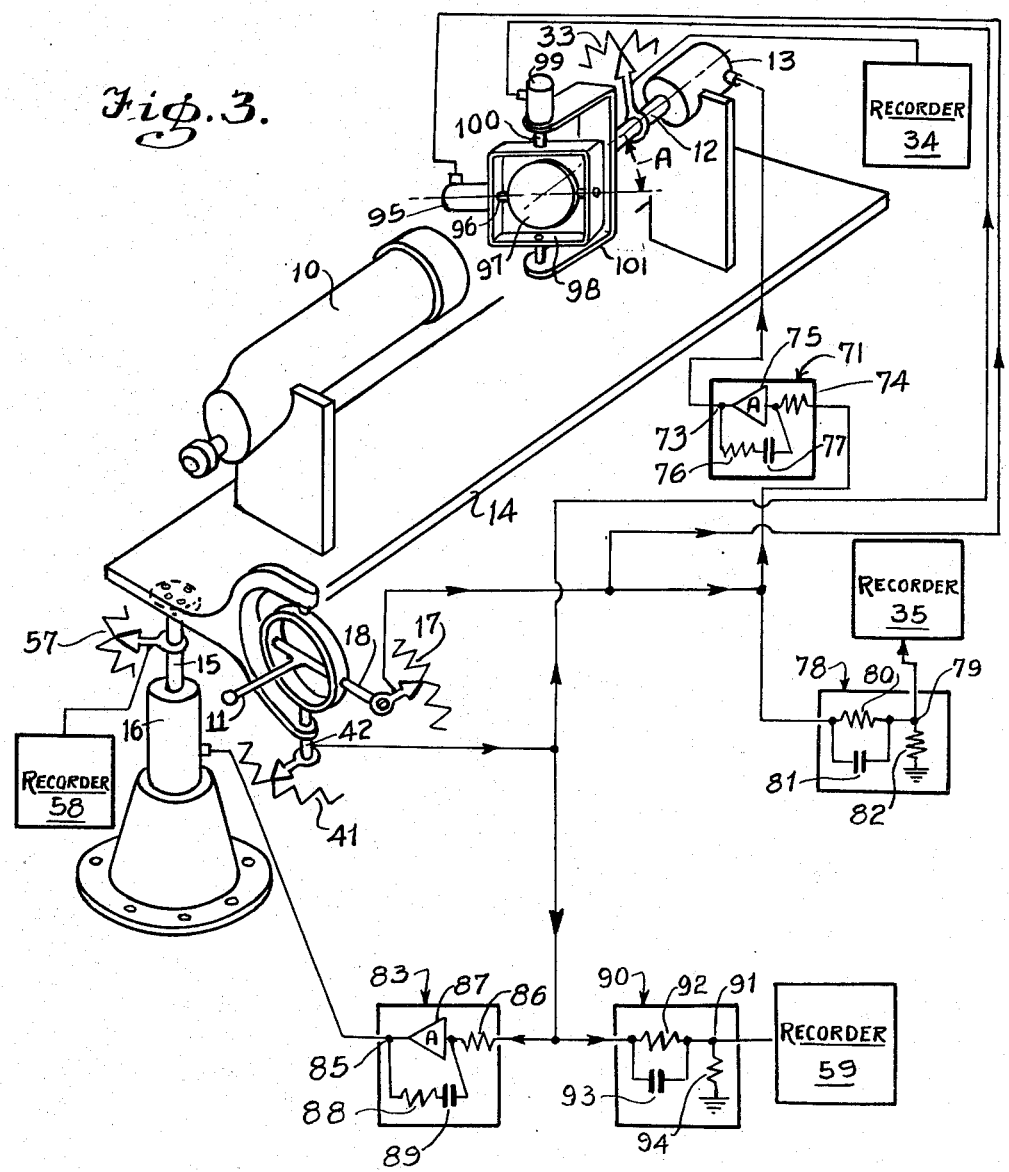

To illustrate a third embodiment of the invention, a schematic illustration of a tracking recording system using a movable mirror in the optical path between a fixed reticle and the object to be tracked is shown in Figure 3. With the exception in method of moving the optical path, this tracking recording system is identical to that previously described and illustrated in Figure 2. A telescope 10, equipped with a reticle, is provided so that an operator can observe the tracking error, namely the position of the moving object relative to the reticle. A control stick 11 is supported by a gimbal so that it can be moved by the operator in azimuth and elevation according to the observed tracking error. A movable mirror 97 is mounted in front of the telescope 10 with its center on the axis of the telescope. The face of mirror 97 lies in a vertical plane and forms an angle of 45 degrees with the axis of the telescope—also the axis of shaft 12—in a horizontal plane. This position of the mirror corresponds to zero elevation and azimuth angles of the optical path, that is, the optical path is horizontal and is directed toward a reference azimuth direction; this azimuth direction making an angle of 90° with the telescope axis. The optical path between the reticle and the object to be tracked is movable in elevation by the motor 95 through the shaft 96 by moving mirror 97 about shaft 96 relative to frame 98. The optical path is also movable in elevation by motor 13 which rotates frame 98 about the axis of shaft 12. The optical path between the reticle and the object to be tracked is movable in azimuth by the motor 99 through the shaft 100 by moving mirror 97 about shaft 100 relative to frame 101 and frame 14. The optical path is also movable in azimuth by motor 16 through shaft 15 which moves from 14. The case of motor 16 is fixed in reference to the earth. Since the angular deflections of mirror 97 relative to frames 98 and 101 are small, the mirror may also be deflected in both axes by magnetic coils directly linked to the mirror and operating against springs.

A potentiometer 17 is mounted with its output shaft coupled to the horizontal shaft 13—i. e., the elevation axis—of the control stick 11 and its case attached to the inner gimbal supporting the control stick. This potentiometer 17 is used to convert the control stick position in elevation into an electrical signal. This signal output is used to drive motor 95 so that the elevation deflection of mirror 97 relative to frame 98 is proportional to the control stick position in elevation. This deflection is accomplished with a high frequency response compared to the human operator by a conventional servo mechanism.

The electrical signal output from potentiometer 17 is sent through control mechanism 71 (identical to mechanism 71 of Figure 2) which is used to move the motor 13 by a conventional servo mechanism with a speed proportional to the sum of the elevation position of the control stick and the time integral of this position. A potentiometer 33 is mounted with its contact coupled to shaft 12 and its case attached to frame 101. This potentiometer 33 provides an electrical signal proportional to the rotation of shaft 12 which in turn is proportional to the deflection of the optical path in elevation less the control stick position in elevation. This signal is recorded in conventional recorder 34. Signal output of potentiometer 17 is also fed through circuit 78 (identical to circuit 78 of Figure 2) which forms the smoothed sum of the control stick position in elevation and the rate of change of the control stick position in elevation. This sum is the estimate of the elevation tracking error plus the control stick position in elevation. This sum is recorded in conventional recorder 35.

The position of the control stick 11 in azimuth is converted into an electrical signal by potentiometer 41 which is mounted with its contact coupled to the vertical shaft 42 of the gimbal supporting the control stick 11 and its case attached to frame 14. This signal output is used to drive motor 99 so that the azimuth deflection of mirror 97 relative to frame 101 is proportional to the control stick position in azimuth. This deflection is accomplished with a high frequency response compared to the human operator.

The electrical signal output from potentiometer 41 is sent through control mechanism 83 (identical to mechanism 83 of Figure 2) which is used to move the motor 16 by a conventional servo mechanism with a speed proportional to the sum of the azimuth position of the control stick and the time integral of this position. A potentiometer 57 is mounted with its output shaft coupled to shaft 15 which supports frame 14 and its case attached to motor 16. This potentiometer 57 provides an electrical signal proportional to the azimuth angle of frame 14 which in turn is proportional to the deflection of the optical path in azimuth less the deflection of mirror 97 relative to frame 101 in azimuth. This signal is recorded in conventional recorder 58. Signal output of potentiometer 41 is also fed through circuit 90 (identical to circuit 90 of Figure 2) which forms the smoothed sum of the control stick position in azimuth and the rate of change of the control-stick position in azimuth. This sum is the estimate of the azimuth tracking error plus the control stick position in azimuth. This sum is recorded in conventional recorder 59.

The described three embodiments of the invention are equal insofar as each of them uses two recorders for each axis: The recorders 34 and 58 which record, without any transformation, at least one part of the motion of the telescope namely the part pertaining to aided tracking and therefore including time integrals of the position of the control stick; the recorders 35 and 59 which record the motion of the control stick without an integral being added but which serve as a basis for the computation of the tracking error, preferably by a computer included in the system. This computation involves a smoothing process of the depicted data and, therefore, takes time. Hence, the results of these two records cannot be added directly. In order to derive from the tracking recording system, as a final result, the measure of the direction of the line of sight toward the moving object, the results recorded by the recorders 34 and 58 must be shifted to a later time before they can be added to the records 35 and 59 to make the sum of these records present the corrected measure of the direction toward the moving object. As a variation of the invention, this addition may be achieved within the tracking recording system by the introduction of a time-delay device to shift the data containing the aided tracking part by a fixed time increment—namely by the time needed to compute the smoothed rate of change of the handle position.

Figure 4:
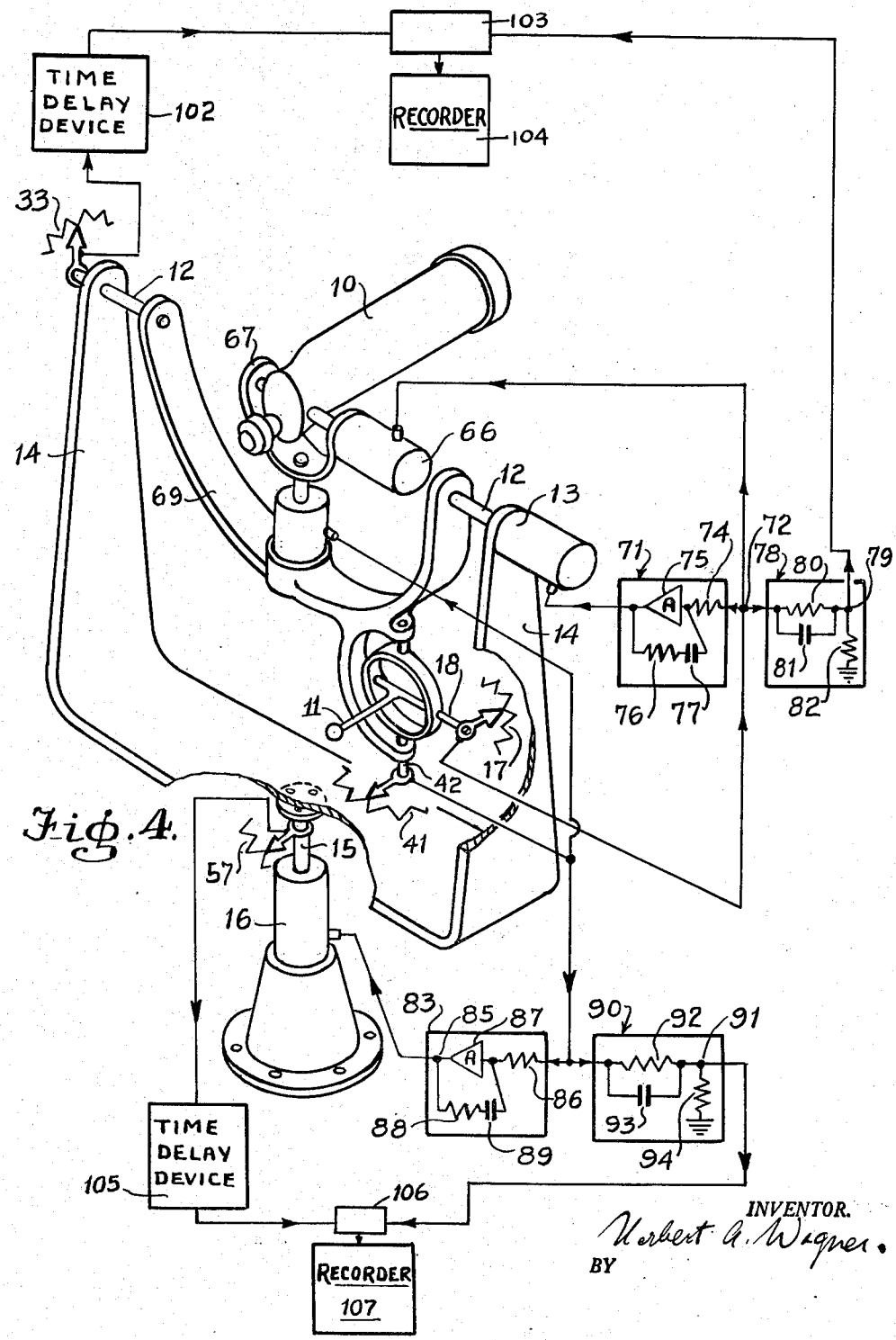

Such a recording system is shown in Figure 4. The tracking system is identical to that of Figure 2 but the recording system is also directly applicable to the systems of Figures 1 and 3. The output of potentiometer 33 which is proportional to the elevation angle of the telescope is passed through the time-delay device 103. The time delay may be achieved by several conventional means, e. g., the information may be played through a magnetic tape recorder which has a recording head and a playback head operating simultaneously. The playback head is mounted a certain distance—in terms of length of tape—behind the recording head. This length of tape along with the linear speed of the tape through the heads determine the time delay. The information picked up by the playback head is then summed, by the adding mechanism 103, with the output of computing mechanism 78 which is the estimate of the elevation tracking error; this sum is recorded in recorder 104. Similarly, the output of potentiometer 57—the azimuth angle of the telescope—is passed through the time-delay device 105 and summed, by the adding mechanism 106, with the output of mechanism 90 the estimate of the azimuth tracking error, and the sum is recorded in recorder 107.

While I have described particular embodiments of my invention for the purpose of illustration, it should be understood that various modifications and adaptations thereof may be made within the spirit of the invention as set forth in the appended claims.

I claim:

1. An optical tracking device comprising a tracking sighting means, means for moving the sighting means, an aided tracking control mechanism, a control stick, a mounting for said control stick, said control stick being manually adjustable on said mounting, means including said aided tracking control mechanism for controlling said moving means responsive to the motion of the control stick, means for generating a signal responsive to the position of the sighting means, and means for simultaneously generating a signal responsive to the rate of motion of said control stick and recording means to record said signals.

2. A tracking device comprising a tracking sighting means, means for moving the sighting means, a first order aided tracking control mechanism, a control stick, a mounting for said control stick, said control stick being manually adjustable on said mounting, means including said aided control mechanism for controlling said moving means responsive to the motion of the control stick, means for generating a signal responsive to the direction in space of the sighting means, and means for simultaneously generating a signal responsive to the rate of motion of said control stick and recording means to record said signals.

3. An optical tracking device comprising a tracking sighting means, means for moving the sighting means, a second order aided tracking control mechanism, a control stick, a mounting for said control stick, said control stick being manually adjustable on said mounting, means including said aided tracking control mechanism for controlling said moving means responsive to the motion of the control stick, means for generating a signal responsive to the position of the sighting means, and means for simultaneously generating a signal responsive to the rate of motion of said control stick and recording means to record said signals.

4. An optical tracking device comprising a tracking sighting means, means for moving the sighting means, an aided tracking control mechanism, a control stick, a mounting for said control stick, said control stick being manually adjustable on said mounting, means including said aided tracking control mechanism for controlling said moving means responsive to the motion of the control stick, means for generating a signal responsive to the position of the sighting means, and means for simultaneously generating a signal responsive to the rate of motion of said control stick and recording means to record the first named signal and separate recording means to record the second named signal.

5. An optical tracking device comprising a tracking sighting means, means for moving the sighting means, a first order aided tracking control mechanism, a control stick, a mounting for said control stick, said control stick being manually adjustable on said mounting, means including said aided tracking control mechanism for controlling said moving means responsive to the motion of the control stick, means for generating a signal responsive to the position of the sighting means, and means for simultaneously generating a signal responsive to the rate of motion of said control stick and recording means to record the first named signal and separate recording means to record the second named signal.

6. An optical tracking device comprising a tracking sighting means, means for moving the sighting means, a second order aided tracking control mechanism, a control stick, a mounting for said control stick, said control stick being manually adjustable on said mounting, means including said aided tracking control mechanism for controlling said moving means responsive to the motion of the control stick, means for generating a signal responsive to the position of the sighting means, and means for simultaneously generating a signal responsive to the rate of motion of said control stick and recording means to record the first named signal and separate recording means to record the second named signal.

7. An optical tracking device comprising a tracking sighting means, means for moving the sighting means, an aided tracking control mechanism, a control stick, a mounting for said control stick, said control stick being manually adjustable on said mounting, means including said aided tracking control mechanism for controlling said moving means responsive to the motion of the control stick, means for generating a signal responsive to the position of the sighting means, and means for simultaneously generating a signal responsive to the rate of motion of said control stick and a recording means for said signals, a time delay device connected to said recording means and to the first named signal generating means, said time delay device delaying the time of arrival of one of said first mentioned signals at said recording means.

8. An optical tracking device comprising a tracking sighting means, means for moving the sighting means, a first order aided tracking control mechanism, a control stick, a mounting for said control stick, said control stick being manually adjustable on said mounting, means including said aided tracking control mechanism for controlling said moving means responsive to the motion of the control stick, means for generating a signal responsive to the position of the sighting means, and means for simultaneously generating a signal responsive to the rate of motion of said control stick and a recording means for said signals, a time delay device connected to said recording means and to the first named signal generating means, said time delay device delaying the time of arrival of said first mentioned signals at said recording means.

9. An optical tracking device comprising a tracking sighting means, means for moving the sighting means, a second order aided tracking control mechanism, a control stick, a mounting for said control stick, said control stick being manually adjustable on said mounting, means including said aided tracking control mechanism for controlling said moving means responsive to the motion of the control stick, means for generating a signal responsive to the position of the sighting means, and means for simultaneously generating a signal responsive to the rate of motion of said control stick and a recording means for said signals, a time delay device connected to said recording means and to the first named signal generating means, said time delay device delaying the time of arrival of said first mentioned signals at said recording means.

References Cited in the file of this patent

UNITED STATES PATENTS

| 1,315,539 | Carson | Sept. 9, 1919 |
| 2,071,424 | Papello | Feb. 23, 1937 |
| 2,099,536 | Scherbatskoy et al. | Nov. 16, 1937 |
| 2,414,102 | Hull et al. | Jan. 14, 1947 |
| 2,414,108 | Knowles et al. | Jan. 14, 1947 |
| 2,550,700 | Lancor et al. | May 1, 1951 |

FOREIGN PATENTS

| 371,517 | Great Britain | Apr. 28, 1932 |